(12) United States Patent
Ashikhmin et al.

(10) Patent No.: US 11,030,214 B2
(45) Date of Patent: Jun. 8, 2021

(54) SYSTEM FOR IDENTIFICATION OF OUTLIER GROUPS

(71) Applicant: Microsoft Technology Licensing, LLC, Redmond, WA (US)

(72) Inventors: Aleksey Ashikhmin, Redmond, WA (US); Sanjay H Ramaswamy, Redmond, WA (US); Andrew C. Owen, Redmond, WA (US); Aaron Harrison, Redmond, WA (US); Sreeram Nivarthi, Redmond, WA (US); Vindana Madhuwantha, Redmond, WA (US); Umashree Narayanaswamy, Redmond, WA (US); Brian Quistorff, Redmond, WA (US); Eric Radtke, Redmond, WA (US); Omar Mustafa, Redmond, WA (US); Di Li, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 16/391,188

(22) Filed: Apr. 22, 2019

(65) Prior Publication Data
US 2020/0334273 A1    Oct. 22, 2020

(51) Int. Cl.
*G06F 16/26* (2019.01)
*G06F 9/451* (2018.01)
*G06F 16/2458* (2019.01)

(52) U.S. Cl.
CPC .............. *G06F 16/26* (2019.01); *G06F 9/451* (2018.02); *G06F 16/2465* (2019.01); *G06F 2216/03* (2013.01)

(58) Field of Classification Search
CPC ...... G06F 16/26; G06F 9/451; G06F 16/2465; G06F 2216/03
See application file for complete search history.

(56) References Cited

U.S. PATENT DOCUMENTS

2008/0189632 A1    8/2008    Tien et al.
2013/0311904 A1    11/2013    Tien et al.
(Continued)

OTHER PUBLICATIONS

Stergios Georgopoulos; Microsoft announces Workplace Analytics; Jul. 6, 2017; Neowin; 2 pages; https://www.neowin.net/news/microsoft-announces-workplace-analytics-a-tool-that-aims-to-improve-employee-productivity/ (Year: 2017).*

(Continued)

*Primary Examiner* — Andrey Belousov
(74) *Attorney, Agent, or Firm* — Schwegman Lundberg & Woessner, P.A.

(57) ABSTRACT

A method may include retrieving metric data on a plurality of groups of users, the metric data including: a value of a performance metric for each of the plurality of groups; and an indication that a first group of the plurality of groups is anomalous with respect to a value of the performance metric of a control group of the plurality of groups; and presenting a user interface, the user interface including: a first portion including a visualization of a comparison of the value of the performance metric for the first group and values of the performance metric of other groups in the plurality of groups; and a second portion including a visualization of trend data of the performance metric for the first group over a period of time.

20 Claims, 7 Drawing Sheets

(56) References Cited

U.S. PATENT DOCUMENTS

2014/0282053 A1  9/2014  Hauschild et al.
2016/0191560 A1  6/2016  Pegna et al.

OTHER PUBLICATIONS

"Workplace Analytics Documentation", Retrieved from https://docs.microsoft.com/en-gb/workplace-analytics/, Retrieved Date: Apr. 18, 2019, 2 Pages.

"International Search Report and Written Opinion Issued in PCT Application No. PCT/US2020/026047", dated May 27, 2020, 14 Pages.

* cited by examiner

SYSTEM FOR IDENTIFICATION OF OUTLIER GROUPS

BACKGROUND

The effectiveness and accuracy of human-driven analysis of large sets of data is increasingly low compared to machine-driven analysis. For example, if an organization needs a time sensitive analysis of a data set that has millions of entries across hundreds of variables, no human could perform such an analysis by hand or mentally. Furthermore, any such analysis may be out-of-date almost immediately, should an update be required.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored, or how they are retrieved. In such instances, it may be assumed that the variables are stored on a storage device accessible by the component via an application programming interface (API) or other program communication method. Similarly, the variables may be assumed to have a default values should a specific value not be described. User interfaces may be provided for an end-user or administrator to edit the variable values in some instances. Unless otherwise specified, the use of "set" means one or more, and excludes an empty set.

Graphical user interfaces (GUIs) may be used to help a user understand the output of any such analysis. One problem of many GUIs is their inability to efficiently communicate information about the outcome. For example, an analysis may result in hundreds of results, but due to the inherent limitations of physical screen size, not all of the results may be able to be displayed at the same time.

As indicated above, a common need of an organization is to efficiently analyze large sets of data, present the data is an easy to understand manner, and act upon the data. For example, consider that an organization wants to know a variety of metrics with respect to its employees (referred to herein as users). These metrics may include collaboration behavior such as how many hours a week a user spends on emails during the work day, how many hours a user spends on emails after hours, how many meetings, etc., and may sometimes be referred to as performance metrics. Organizations may intervene with certain groups to increase productivity within the organization if these collaboration behaviors are known but often the organization may not know there is even a problem with a particular group.

A population (e.g., all employees in an organization) of users may be filtered and grouped according to one or more attributes. For example, the population of users may be filtered according to all those users that report to someone with a "manager 1" title according to an organizational chart. The selection of what attribute(s) to use to filter and group the population may be considered a "treatment" in various examples.

Consider that a "meeting" metric is retrieved for each group in the treatment set. Thus, a first group may spend 35% of their work hours in meetings, a second group may spend 15% of their work hours in meetings, and so on. Consider that the average meeting percentage is 20%. Without context, one may assume that the first group is spending too much time in meetings compared to the average. Yet, it may be that the first group includes a number of users that are dispositioned to have more meeting hours (e.g., they work remotely, their jobs require more collaboration, etc.). Accordingly, unless the first group is compared to another group having similar attributes, any metric comparison may be misleading, and action may be taken unnecessarily.

In order to more accurately compare a treatment group—e.g., a group that is part of the treatment such group 1—a control group may be needed that is similar to the treatment group. A human-focused approach to finding the control group may include a data scientist first attempting to find outlier groups based on comparing a group's metrics to an average metric across an organization. In some instances, the data scientist may try and find similar groups based on a few attributes (e.g., experience level).

The human-focused approach to finding a control group has many deficiencies. First, the amount of data (e.g., attributes) makes it impossible that a human may be able to adequately consider all the data. Accordingly, the human approach may use a reduced data set or a limited set of attributes. Thus, what may look like a similar group for a control is actually dissimilar when the entire data set is considered. Second, finding the groups is time intensive in order to be able to address any anomalies. Thus, it may not be possible to find anomalous groups in an acceptable (e.g., weekly) timeframe for more than a handful of metrics and only if the population of users is small. Third, there may no user interface available to navigate the data and track anomalous groups over time to see the effectiveness of any intervention.

Described herein is a system that alleviates the above problems by providing an end-to-end system that automatically finds a control group and identifies anomalous groups with respect to the control. Furthermore, a user interface is provided that visually shows how far of an outlier an anomalous group may be and what effect an intervention may have on the group.

Figure 1:
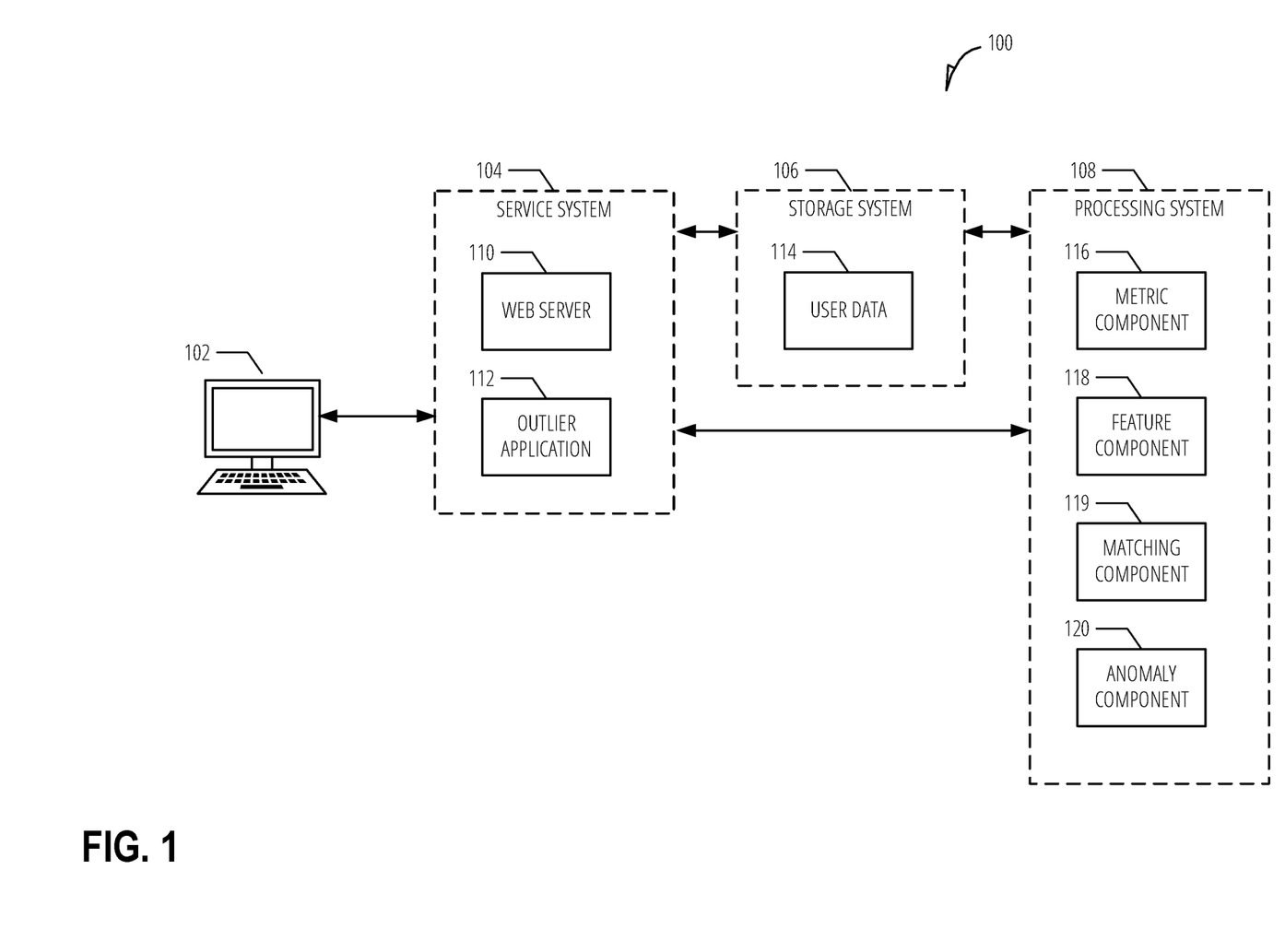
FIG. 1 is a schematic diagram illustrating components of an outlier detection and presentation system, according to various examples.

FIG. 1 is a schematic diagram illustrating components of an outlier detection and presentation system 100, according to various examples. System 100 may include computing device 102, service system 104, storage system 106, and processing system 108. Service system 104 may include web server 110 and outlier application 112. Storage system 106 may include user data 114. Processing system 108 may include metric component 116, feature component 118, matching component 119, and anomaly component 120.

For illustration purposes, system 100 is illustrated as set of separate functional systems and components (e.g., service system 104, storage system 106, processing system 108). However, the functionality of any grouping of systems and components may be performed by a single functional unit. A functional unit may represent computer program code that is executable by a processing unit (e.g., a core of a general-purpose computer processor, a graphical processing unit, an application specific integrated circuit, etc.). The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

In various examples, the systems and components in FIG. 1 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e,g., Bluetooth®, Wi-Fi Direct), or other combinations or permutations of network protocols and network types. A network may include a single local area network (LAN) or wide-area network (WAN), or combinations of LAN's or WAN's, such as the Internet.

Computing device 102 may be, but is not limited to, a smartphone, tablet, laptop, multi-processor system, microprocessor-based or programmable consumer electronics, game console, set-top box, or any other device that a user utilizes to communicate with service system 104, storage system 106, or processing system 108. In an example, computing device 102 may include a display module (not shown) to display information (e.g., in the form of specially configured user interfaces served via web server 110). In some embodiments, computing device 102 may include one or more of a touch screen, camera, keyboard, microphone, and Global Positioning System (GPS) device.

Computing device 102 may receive information from service system 104 that is the result of processing system 108 analyzing data stored in storage system 106. For example, web server 110 may present (e.g., transmit for display) information to computing device 102. Although generally discussed in the context of delivering webpages via the Hypertext Transfer Protocol (HTTP), other network protocols may be utilized by web servers 110 (e.g., File Transfer Protocol, Telnet, Secure Shell, etc.) A user may enter in a uniform resource identifier (URI) into a network browser (e.g., the EDGE® web browser by Microsoft Corporation or SAFARI® web browser by Apple Inc.) that corresponds to the logical location (e.g., an Internet Protocol address) of web server 110. In response, web server 110 may transmit a web page that is rendered on a display device computing device 102.

Web server 110 may enable a user to interact with one or more web applications provided in a transmitted web page or set of web pages. A web application may provide user interface (UI) components that are rendered on a display device of a computing device. The user may interact (e.g., select, move, enter text into) with the UI components, and, based on the interaction, the web application may update one or more portions of the web page. A web application may be executed in whole, or in part, locally on a client device.

The web application may populate the UI components with data from external sources or web server in various examples. The web application may issue API calls to retrieve the data. Conversely, data entered by a user into a UI component may be transmitted using an API call back to the web server. For example, outlier application 112 may be a web application that displays data stored in storage system 106 as it pertains to anomalous groups for a given metric. A more detailed description of outlier application 112 is discussed in the context of FIGS. 2-4.

Storage system 106 may store user data 114. User data 114 may include information on a population of users. The users may be part of an organization (e.g., a company). User data 114 may include an entry for each user in the population. The entry may include values for a set of one or more attributes. The attributes may be organizational attributes in some examples. Organizational attributes may include, but are not limited to, experience level, job title, office location, who the user reports to, etc. User data 114 may be used as input data for the components in processing system 108 as described further herein. Storage system 106 may also store output from processing system 108 that identifies anomalous groups to present to a user via outlier application 112.

Metric component 116 may include definitions and formulas for how to calculate a metric for a given group. Metric component 116 may also include information on potential opportunities to help outlier groups and what information to highlight by outlier application 112. For example, metrics may include:

Email Hours
Meeting Hours
After-hours Collaboration
Recurring Meetings (Meeting Hours with IsRecurring set)
Double-booked Meetings (Meeting Hours with conflicts; non-declined)
Multi-tasking in Meetings
Meeting Hours (with Manager presence)
Meeting Hours (with multiple levels)
Focus Hours (e.g., blocks of time designated for working)
Long Meetings (Meeting Hours with meeting time greater than the specified threshold)
Large Meetings (Meeting Hours with number of attendees greater than the specified threshold)

In an example, an email overload opportunity may include accessing email activity and highlighting the groups with the largest amount of time spent composing or replying to emails. A suggested intervention may include identifying the opportunity to increase focus time (e.g., proactively blocking off times to work). A meeting overload opportunity may access meeting activity, highlight the groups with the largest amount of time spent in meetings, and identify an opportunity to reduce meeting overload for the highlighted group(s). An after-hours opportunity may include accessing after-hours activity (meetings or emails), highlighting the groups with largest amount of activity, and identifying an opportunity for better work-life balance. Double-booked meetings may lead to decision bottlenecks. Metric component 116 may look for groups that suffer from the highest number of double-booked meetings and identify an opportunity for a meeting hours program that helps users better manage their meeting schedules.

An opportunity to increase meeting effectiveness may be determined by looking at multitasking characteristics (e.g., emails, direct messaging) in all meetings and highlighting the groups with the greatest amount of multi-tasking. Another meeting opportunity may be to look for redundant meetings. A redundant meeting may be a meeting with multiple-level attendee presence (e.g., more than one manager of a certain level). The groups with the largest redundant meetings may be highlighted with an opportunity for a more targeted attendance. A low-quality meeting may be one in which the aggregate representation of redundant, conflicting, and multitasking meetings. The groups which have the highest number of low-quality meetings may be identified and an opportunity to increase meeting effectiveness may be presented. Another meeting opportunity may look at all meetings with a manager presence, highlight the groups with the largest number of such meetings, and identify the opportunity for delegation/empowerment to other levels of employees.

Below are additional metrics and opportunities that may be calculated and identified by metric component 116:

Long meetings: By looking at all meetings, highlight the % of long meetings across all groups, and identify the opportunity to consolidate and increase capacity.

Large meetings: By looking at all meetings, highlight the % of large meetings across all groups, and identify the opportunity to focus.

Meetings may be more effective instead of long conversations: By evaluating back-and-forth responses, if any thread goes beyond 6 (or another threshold) responses, then it may be labeled a long conversation. Then the system may look for such patterns across similar groups, and identify the group with the highest number of long conversations as an opportunity for better collaboration behaviors.

Recurring meetings: By looking at all meetings, highlight the % of recurring meetings across all groups, and identify the opportunity to consolidate.

Collaboration variance: By looking at email vs. meeting behaviors, highlight the groups with the largest variance between the two, and the identify the opportunity to reduce email overload.

Manager after-hours activity: By looking at after-hours activity, highlight the groups with highest correlation where manager's after-hours activity also drives directs' after-hours activity, and identify the opportunity for work-life balance.

In various examples, time-trend variations for the above metrics may be calculated or accessed for all of the above. For example, the number of long meetings a group has may be monitored for the previous n (e.g., 90) days. Then, a suggestion may made to the group to reduce the number of long meetings. The group may be monitored automatically by the system post-suggestion to determine if the suggestion had any effect on the number of long meetings. A graph (e.g., line, bar) may be generated that shows number of long meetings held before and after the suggestion. For example, metric data from 90 days before and 90 days after may be shown on the graph.

Feature component 118 may, for each treatment group, identify the set of attributes which play a significant role (e.g., meet a certain threshold of correlation) in determining if a data point (e.g., a user) belongs to a treatment or not. Feature component 118 may additionally, for each metric, identify the set of attributes which play a significant role in predicting the value of the metric. These attributes may be used by matching component 119 to find the control group. A more detailed discussion of feature component 118 is described with respect to FIG. 5.

Matching component 119 may be used to find, for each member in the treatment group, a similar user to form the control group. In an example, a greedy algorithm may be used to form the control group which acts a nearest neighbor algorithm. The algorithm can perform two types of nearest-neighbors searches, one-to-one and one-to-many matching. One purposes of the latter is to increase sample size of a control group and reduce variance. A one-to-one matching may ensure a quality match for each treated user and for computational simplicity. The analysis holds on the assumption that most users in an organization have ideal or normal metric values. By using the median metric value per group, the influence of outliers or abnormal control users on control group metrics may be reduced—although this may not eliminate the risk of the control group also exhibiting abnormal, biased behavior. In practice, the risk of generating an abnormal control group may be low due to the random nature of being selected as a match. Other statistical measures (e.g., average, statistic deviation) may be used instead of median in some examples.

To find the nearest neighbor of a treated users, all the categorical variables may be converted (e.g., encoded) into binary variables and then the Mahalanobis distance may be calculated between a pair of users in both the groups. A matched pair between treated group member and control group member may have the smallest distance. In the case of ties, a match may be randomly selected from among the possible controls. Further details of matching component 119 are discussed in the context of FIG. 5 and FIG. 6.

Anomaly component 120 may be used to, for each treatment group and date range (e.g., a week), find similar users (e.g., the control) for the treatment using a matching technique. The matching technique may use the Mahalanobis distance according to various examples. The distance may be calculated based on the attributes selected by matching component 118 and, optionally, a set of mandatory attributes. Anomaly component 120 may then calculate the statistical deviation between treatment and control group using a studentized t test, as an example, and execute a sensitivity analysis to determine the reliability of the results.

Figure 2:
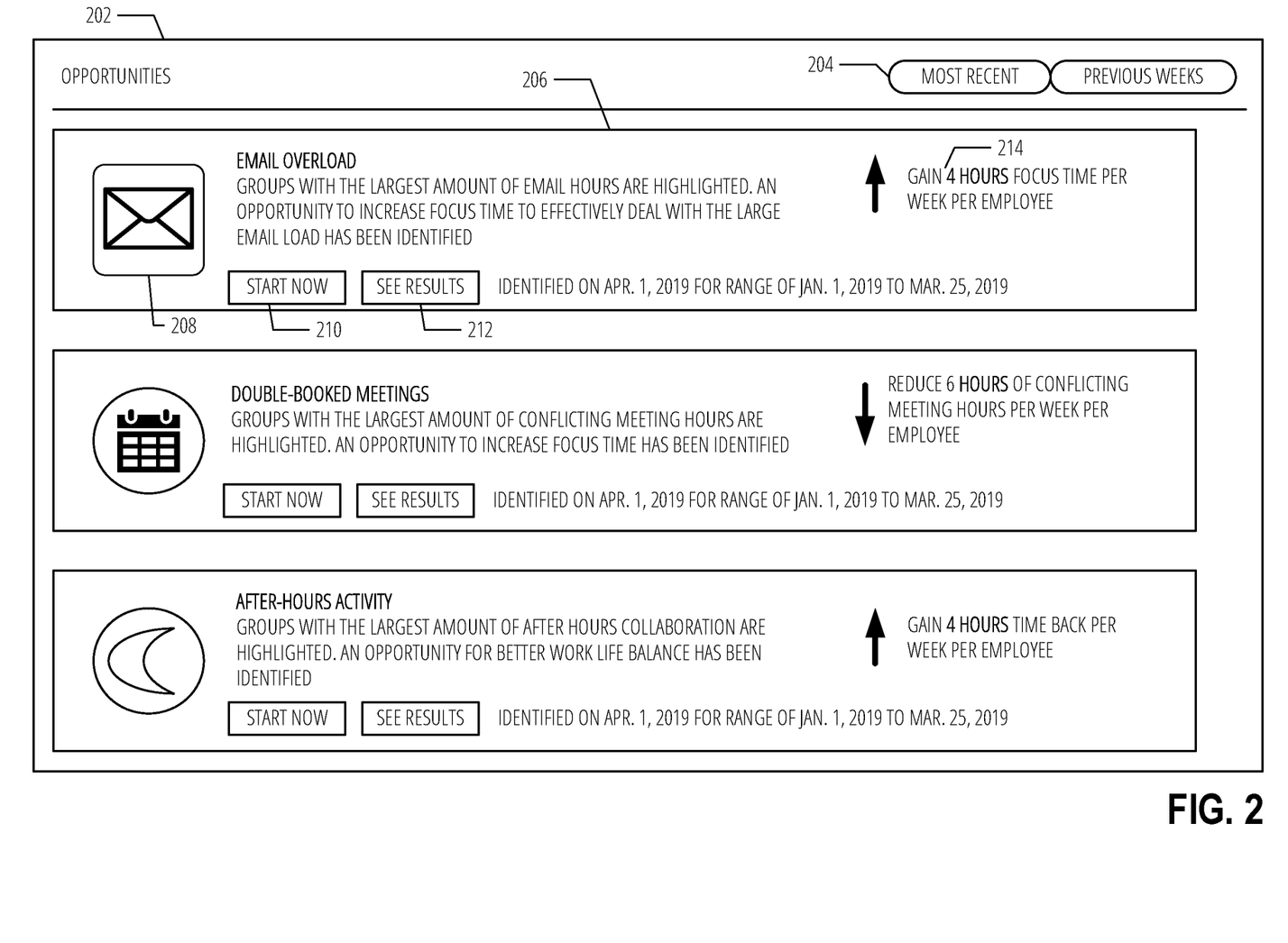
FIG. 2 is a user interface illustrating an overview of detected opportunities, according to various examples.

FIG. 2 is a user interface 200 illustrating an overview of detected opportunities, according to various examples. Interface 202 may be presented by web server 110 via outlier application 112 in various examples. For example, a user may enter in their credentials to outlier application 112 and a web page with interface 202 may be presented that shows a series of opportunities detected based on the most recent processing of data by processing system 108.

Interface 200 includes date identifier 204, opportunity 206, icon 208, selection elements 210, 212, and impact description 214. Each opportunity may be based on anomaly component 120 indicating that at least one treatment group has a median value (or other chosen statistical measure) for a metric that is statistically significantly different than the median value of a control group for the treatment group for a given time period.

Time period selection element 204 may be used to filter the opportunities based on the analyzed time period. For example, by default the most recent identified opportunities are shown for Apr. 1, 2019. A user may select "previous weeks" in interface 202 to view opportunities from previous weeks.

Each identified opportunity may include an icon (e.g., icon 208) that represents the opportunity. For example, icon 208 is an email icon because the opportunity relates to email. The opportunity may also include a description indicating to the user the anomalous behavior and an opportunity to help bring a treatment group back in line with the performance of the control group. Impact description 214 may indicate the type of change in the treatment group that may be expected should a plan (e.g., suggested behavior modifications) be put in place.

Selection elements 210, 212 may be used to start a plan or view the results of a plan already put in place. For example, selection element 210 may take a user into a detailed view of the opportunity such as discussed in FIG. 3. Selection element 212 may take the user into a user interface that shows how the treatment group has performed with respect to the metric before and after a plan has been put into action. For example, a line chart may track the percentage of emails over a period of time before and after a treatment group was told to try and increase their focus hours.

Figure 3:
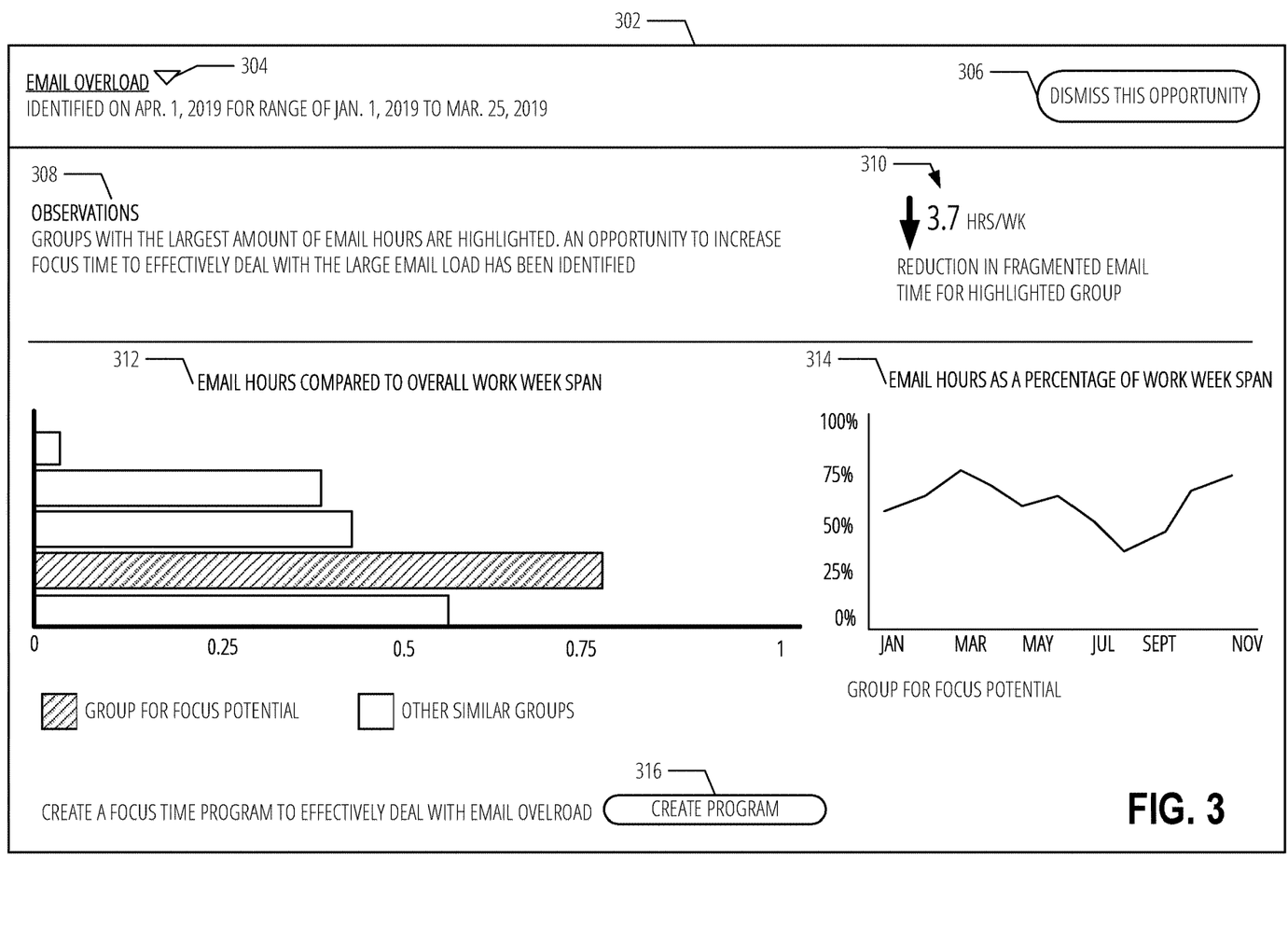
FIG. 3 is a user interface illustrating a detailed view of a detected opportunity, according to various examples.

FIG. 3 is a user interface 302 illustrating a detailed view of a detected opportunity, according to various examples. User interface 302 may be presented in response to a user clicking selection element 210 in interface 202. User interface 302 may include drop-down 304 which shows the various available opportunities and may be pre-filled with the selected opportunity. All other available opportunities in this drop-down may be shown in the same display order as interface 202 in various examples.

There may be an "Observations" callout section 308 that contains descriptive text for the opportunity. Alongside this may be a numeric callout 310 to the possible productivity gained by addressing the problem. The "Observations" section may be followed by one or more graphs (or other visualizations) to visually highlight the opportunity.

The first graph 312 may highlight the anomalous group (with a specific color or pattern, etc.) and provide a perspective of how it compares with other similar groups. The list of similar groups to show in the chart may be five-ten groups around the median of the statistical score (normalized score in the range of 0-1 of T-TEST or any other methodology employed) of the metric (e.g., number of email hours). By employing median (instead of average), outliers may be taken into account on either side of the range and provides a better normalized perspective.

The second graph 314 may be a trend graph that by default shows the trend for three months (if available) before and after the timestamp of the opportunity (e.g., Apr. 1, 2019 in FIG. 3). Graph 312 may be interactive such that by clicking on one of the groups, the trend line for the selected group may be shown on graph 314 along with the anomalous group.

User interface 300 may include a toggle button to show values in percentage or actual metrics. This may be applicable to some metrics and not to others depending on whether highlighting a problem group in terms of metric ratios (such as email hours as a percentage of work week span, for example) or plain metrics themselves. If a toggle button is present the data labels in graph 312 may change between percentage and value; in graph 314, the y-axis and chart data may change between percentage and value.

The "Dismiss" option 306 may allow the user to dismiss the presented opportunity if not relevant/appropriate. Upon clicking button 306, a confirmation prompt may be shown to confirm the dismiss action. Upon confirmation, the presented opportunity may be removed from the user's view (it could be preserved in the backend for logging/auditing purposes if needed), and this may no longer appear until the next processing run. The opportunity may present itself again depending on subsequent processing runs if the opportunity is detected again.

An option 316 may also be presented with a description of how to effect the change in the group to achieve the productivity gain displayed in callout 310.

Figure 4:
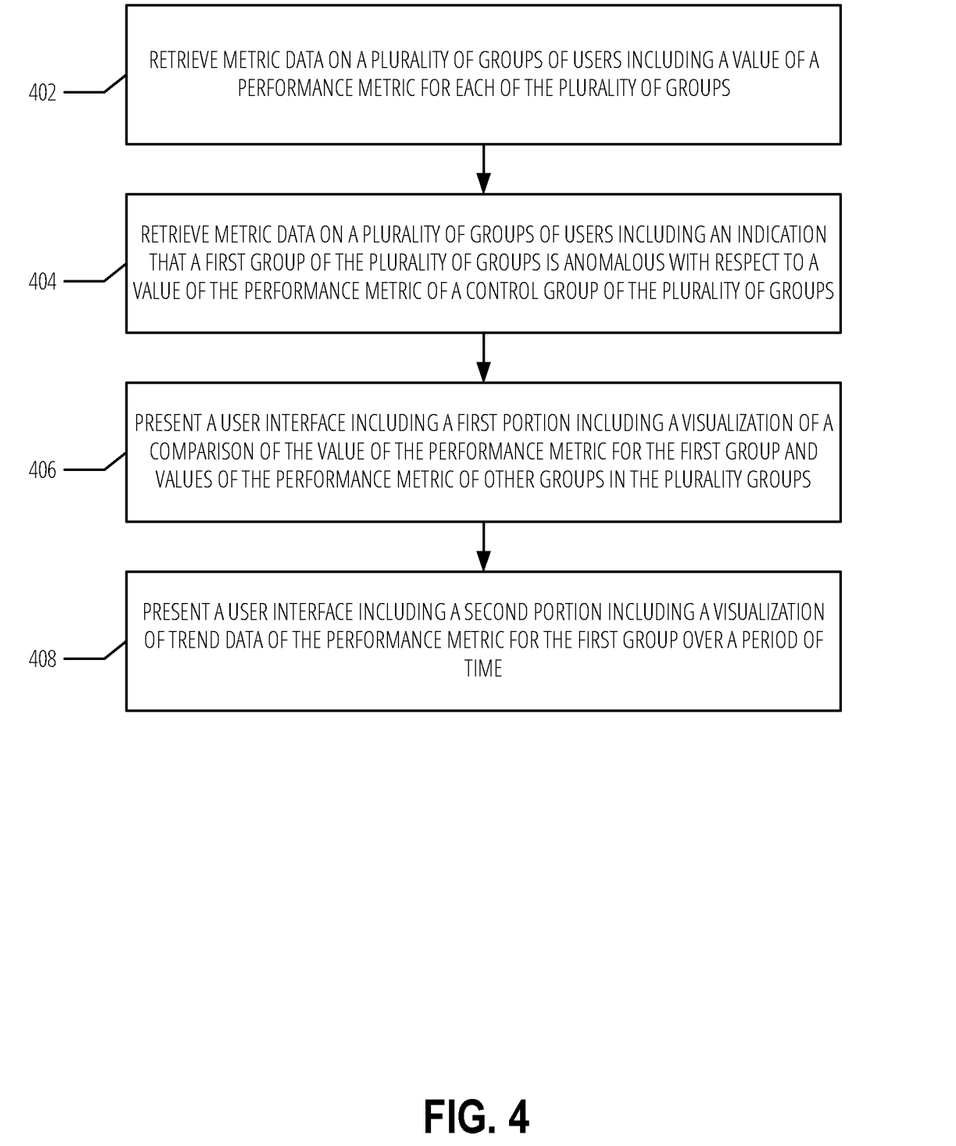
FIG. 4 is a flowchart illustrating a method to present a user interface, according to various examples.

FIG. 4 is a flowchart illustrating a method to present a user interface, according to various examples. The method is represented as a set of blocks that describe operations 402-408 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct another component of the computing device(s) to carry out the set of instructions. For example, the computing device may instruct a network device to transmit data to another computing device or the computing device may provide data over a display interface to present a user interface. In some examples, performance of the method may be split across multiple computing devices using shared computing infrastructure.

In various examples, at operation 402 the process may include retrieving metric data on a plurality of groups of users that includes a value of a performance metric for each of the plurality of groups. At operation 404 the process may include retrieving metric data on a plurality of groups of users including an indication that a first group of the plurality of groups is anomalous with respect to a value of the performance metric of a control group of the plurality of groups.

For example, outlier application 112 may access data outputted by processing system 108. The output may indicate how the groups were formed (e.g., what attribute was used to define a group), the value of a performance metric (e.g., 25% of hours of all hours spent on email) for each group, and a variance value for each group indicating how far from a control group a particular group is for a performance metric. The output may indicate data for multiple metrics and treatments. A group may be identified by identifiers of users in the group (e.g., employee IDs).

In various example, each of the users in the plurality of users may be associated with values for a plurality of attributes. The attributes may be part of a user profile of the user and may correspond to organization attributes. Organizational attributes may include attributes such as a level designation, a geographic area that the user works, what staffing group the user belongs to, whether the user reports to another manager and what level of manager, an email domain, an incentive plan type, whether the user is internal or external, months in a position, months the user has had their current title, function type (e.g., a user's job function), a layer (e.g., distance between a user and a head of an organization), a time zone, organizational level, whether the user was part of an acquisition, a profession of the user, and a pay scale level.

The plurality of groups may be selected based on sharing a value of a selected attribute of the plurality of attributes.

For example, the grouping may be based on each user having a value of '2' for the layer attribute. Users in the control group may be selected based on finding similar users that exclude the selected attribute. The control group may be selected based on a matching algorithm using the Mahalanobis distance as described in more detail in this disclosure.

In an example, the indication that the first group of the plurality of groups is anomalous (e.g., is greater than a threshold difference based on a metric or formula) with respect to the control group of the plurality of groups is based on a difference between a median value of the performance metric for the plurality of users and a median value of the performance metric for the control group exceeding a threshold. The indication may be part of the output of processing system 108. Other statistical measures may be used instead of a median (e.g., average) to detect anomalies without departing from the scope of this disclosure.

In various examples, at operation 406, the method may include presenting a user interrace that includes a first portion with a visualization of a comparison of the value of the performance metric for the first group and values of the performance metric of other groups in the plurality groups. The visualization of the comparison may a graphical depiction or textual depiction of the values of the performance metric of the first group in comparison with at least one other group. For example, a bar chart may be presented with the first group and four other groups as described in FIG. 3 with respect to graph 312. The other groups may be the next closest anomalous groups (e.g., those with the greatest variance). Other types of graphs may be used without departing from the scope of this disclosure.

In various examples, at operation 408, the method may include presenting in the user interface a second portion that includes a visualization of trend data of the performance metric for the first group over a period of time. Trend data may be a set of performance metric, time period pairs. For example, the value of the performance metric for each week over a 90-day period may be shown. Graph 314 and its accompanying description above may be an example of the visualization of trend data.

In various examples, the method may further include receiving a selection in the first portion of a second group of the plurality of groups. The selection may be made by clicking on one of the bar charts for a group other than the first group in some examples. Based on the selection, the trend data may be updated to include trend data for the selected group. For example, a line chart with two lines may be presented. The trend data may be based on data stored in storage system 106 in various examples. The line for the first group may be distinguishable (e.g., bolded, colored, thicker) than the line for the selected group.

In various examples, the user interface may further include a selection element configured to change the performance metric. For example, the performance metric may be changed from the number of email hours to the number of double-booked meetings. The operations of 402 and 404 may be repeated but with respect to the newly selected performance metric. Thus, different groups may be anomalous with respect to the new performance metric. The user interface may be updated based on the metric data associated with the newly selected metric. For example, new bar charts and trend data charts may be presented.

Figure 5:
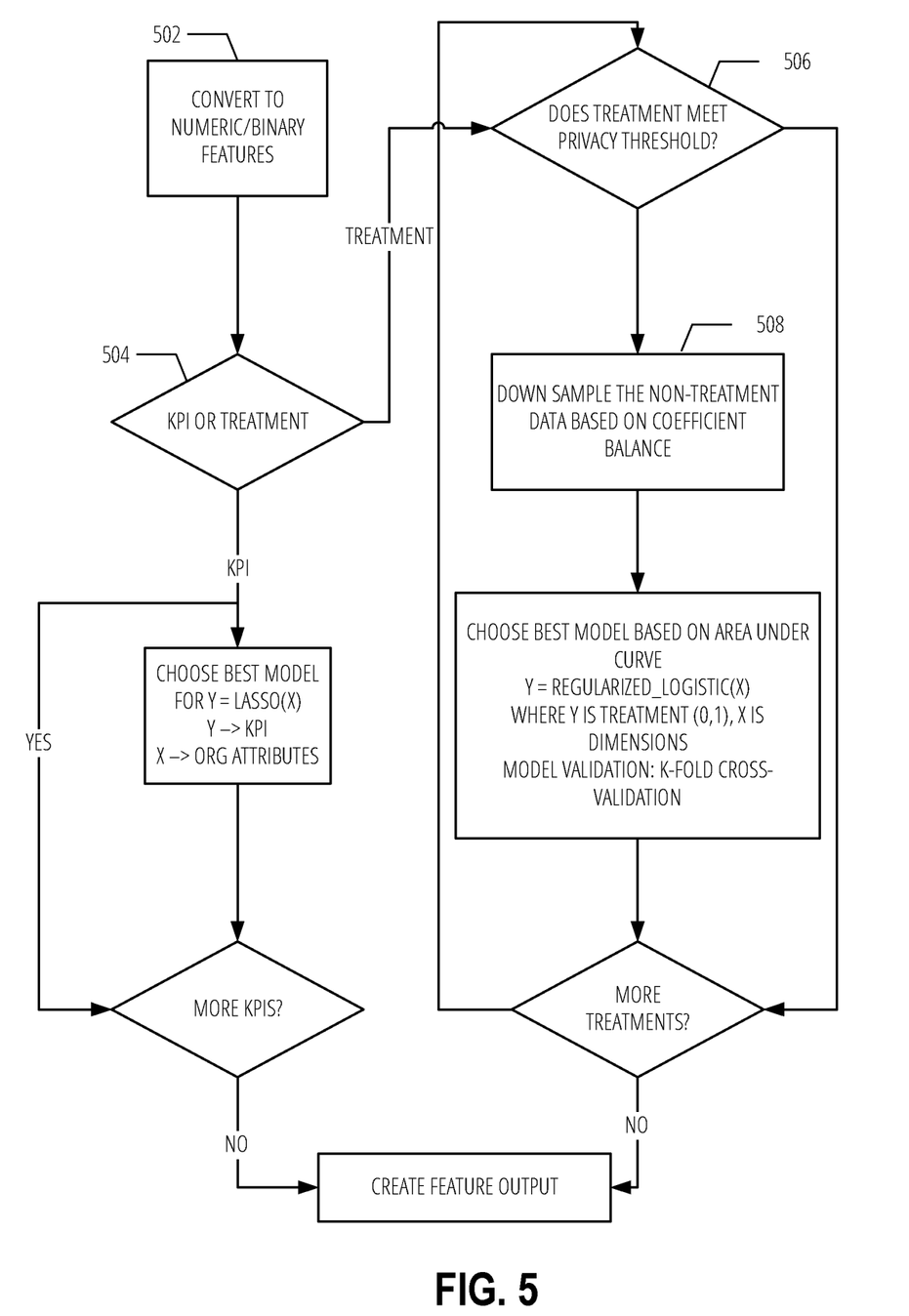
FIG. 5 is a flowchart illustrating a technique to find significant dimensions for use in determining a control group, according to various examples.
Figure 6:
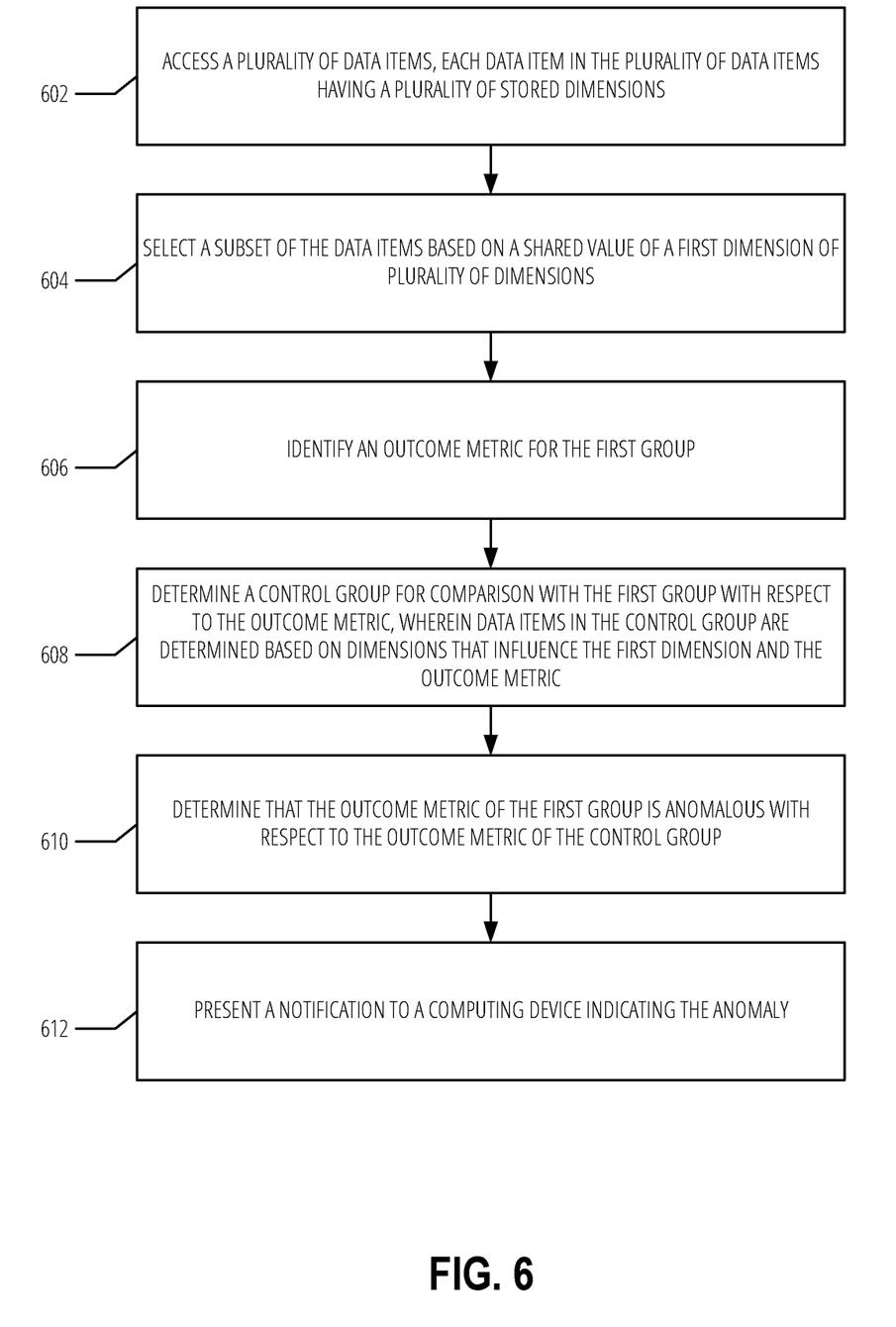
FIG. 6 is a flowchart illustrating a method to identify anomalies in a set of data.

FIGS. 5-6 describe more detail with respect to how to determine a control group and find statistically relevant variances between a control group and a treatment group. Because the process in FIGS. 5-6 is not limited to performance metrics and users in an organization, some of the terminology may differ. For example, instead of "attributes," the term "dimensions" may be used. Similarly, instead of a "user," the term "data point" may be used. Additionally, metrics may be referred to as "key performance indicators" or KPIs. For illustration purposes, however, the example of finding anomalous behavior of users in an organization is still discussed.

One of the elements of creating an accurate control group is making sure that the distribution of attributes (also referred to as confounding variables) in the control group is the same as in the treated group. When a proper match is made on known confounding factors, the control group acts as a counterfactual surrogate. Using the treated group and the matched control group for analysis makes the inferences and conclusions about KPIs less susceptible to known biases caused by the attributes.

In various examples, a post-double selection method may be used to identify confounders for an outcome Y (first selection), and Treatment (second selection). In an application, an outcome is one of the KPIs (e.g. Meeting Hours) and the treatment is an attribute (e.g., Manager) or a user-defined combination of attribute values. Post-double selection may train two models for confounder identification: a Lasso model in a first selection and a regularized logistic regression in the second selection. Features for these models are attributes (e.g., organizational attributes), which are converted into binary variables if an attribute is categorical and the labels are outcome values and treatment values correspondingly. Using cross-validation, procedure processing system 108 may tune the model's hyper-parameters e.g. lambda regularization term) to get the best performance in terms of mean squared error and receiver operating characteristic metrics.

Features which have non-zero coefficients in the models are confounders. Since the confounders influence both outcome and treatment, they should be controlled for in order to estimate a treatment effect. Control is realized through a matching procedure. The procedure searches for subjects in a population which look like treated subjects with respect to confounders and form a control group. The Mahalanobis distance may be utilized to calculate a likeness between subjects.

It may be difficult to achieve perfect matching, which may create an imbalance in the distribution between a treated group and the control group. This imbalance should be in an acceptable range. The standard mean difference (SMD) metric may be used to monitor the balance.

$$SMD = \frac{\overline{X}_{treatment} - \overline{X}_{control}}{\sqrt{\frac{s^2_{treatment} + s^2_{control}}{2}}}$$

A default value of SMD value is less than 0.01, but may be adjusted by an administrator of the system as appropriate.

FIG. 5 is a flowchart illustrating a technique to find significant dimensions for use in determining a control group, according to various examples. Feature component 118 may perform the operations described in FIG. 5, according to various examples. The description of the operations may be discussed in the context of the R programming language, but other programming languages may be used without departing from the scope of this disclosure.

Feature component 118 may be used to find the control group by determining which of the dimensions are having a significant impact in determining the value of KPI and whether a data point belongs to a control or treatment. Without reducing the dimensions, if there are n binary dimensions in the input, there would be 2" combinations of values and it would be very hard to find a match. Accordingly, the process attempts to find the significant dimensions for KPI and treatment, separately, and then combine them when finding matches. Since the matching is based on distance, the process may first need to convert all character/string columns in the dimensions to binary features (operation 502) prior to feature selection.

With respect to a dimension that is not part of the treatment definition (e.g., decision operation 504), a Lasso regression may be run to predict the values of a KPI against all the dimensions. The model with the least MSE [Mean Squared Error] may be picked. A threshold called mseThreshold may be used which determines how much error is tolerable while picking the next best model. The process may stop looking for more accurate models when the difference in the error becomes less than this threshold. As an example, the following code may be used:

lambda←10 ^seq (1, −2, length=10)
lasso.mod←glmnet(x[train,], y[train], alpha=1, lambda=lambda, standardize=TRUE)

This process may be repeated for each KPI.

Since a majority of the data is not in treatment, training using the entire data set may result in the result being biased towards nontreatment. Accordingly, input for non-treatment group may be downsized and then run a regularized logistic regression to determine the significant features for dimensions of the treatment (operation 508). The amount by which we downsize may be controlled by CoefficientBalance. As an example, the following code may be used:

cv.lasso←cv.glmnet(x, y, alpha=1, lambda=lambda, family="binomial", type.measure="auc", nfolds=10)

A check may also be made to ensure that any resulting group is not below a privacy threshold (operation 506) that may enable someone to identify an individual in the group. Other privacy checks may be used as well such as not including too many dimensions that in combination may permit identification of a particular user.

Matching component 119 may use the identified significant features for the KPI and treatment to identify a control group for a given KPI. In some examples, there may be mandatory features that are included as well. Matching component 119 may use Mahalanobis distance to find a similar user for each user in the treatment group.

$$d(\vec{x}, \vec{\psi}) = \sqrt{(\vec{x} - \vec{\psi})^T S^{-1} (\vec{x} - \vec{\psi})}.$$

Example code for matching may be:
greedyMatch←Match(Tr=dataWeek$treatmentIndicator, M=1, X=dataWeek[featuresToMatchOn], replace=FALSE)

Once a match is made for everyone in the treatment, matching component 119 may determine the balance factor (covariance of values between treatment and control) of each feature chosen. Only those treatments where balance of all features qualify over the SMD threshold may be considered for further analysis. Sample code for this calculation may be:

smd←ExtractSmd(matchedTable)
listUnbalancedHR←row.names(smd)[which (smd>smdThreshold)]

Statistical checks may be made to determine if the control group and treatment group are similar. For example, the null hypothesis may be that the treatment group and control groups are similar. A statistical one-sided t test may be performed using difference between treatment and control group values. If the p value is <0.05 the null hypothesis may be rejected and say that groups are dissimilar.

There is a possibility that the above processes may have missed identifying some significant features which influence the treatment. To determine the impact of these unobserved confounders, a sensitivity test may be run using different values of γ from 1 to 10 and stop at a point where p value meets the threshold. In various examples, γ of 1→ Low confidence; 5→ Good confidence; and 10→ Very high confidence. A default γ may be treatments with γ>3 and identify the one with highest t test deviation as an anomaly. This process may be performed by anomaly component 120.

FIG. 6 is a flowchart illustrating a method to identify anomalies in a data set. The method is represented as a set of blocks that describe operations 602-612 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 6. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 602, in various examples, the method may include accessing a plurality of data items, each data item in the plurality of data items having a plurality of stored dimensions. The data items may be any type of data. For example, the data item may be an image, a user profile, a received set of data entries, etc. The data item may be stored in a storage device according to various example. The dimensions of a data item may differ depending on the type of data item and may be metadata in some examples. For example, if a data item is a user in a population of users, the dimension may be organizational attributes. If the data item is a received set of data, the dimensions may be who sent the data, when the data was sent, the number of entries in the data, etc.

At operation 604, in various examples, the method may include selecting a subset of the data items based on a shared value of a first dimension of plurality of dimensions. For example, a user interface may be presented with a drop-down menu configured with entries for each of the available dimensions. A user may select a dimension or a plurality of dimensions to use to create the first group. For example, if the data items are users, the selected dimension may be whether or not the user reports to a manager of any level. If the data item is a received set of data entries, the dimension selected may be the date. Thus, the first group may include all sets of data entries received on a particular date.

At operation 606, in various examples, the method may include identifying an outcome metric for the first group. The outcome metric may be selected from another drop-down menu in a user interface in various examples. The outcome may be a performance metric in some instance (e.g., the amount of email a user sends in a week). In another example, the outcome metric may be the amount of errors a received set of data entries has during processing of the set of data entries.

At operation 608, in various examples, the method may include determining a control group for comparison with the first group with respect to the outcome metric. The data items to include in the control group may be determined based on dimensions that influence the first dimension and the outcome metric. Different models may be used to determine what dimensions influence what data items are included in the first group and what dimensions influence the outcome metric. Both models may be variants of regression algorithms in various examples. A dimension may be said to influence the first dimension and outcome metric based on the dimension's coefficient being nonzero after application of the models.

At operation 610, in various examples, the method may include determining that the outcome metric of the first group is anomalous with respect outcome metric of the control group. For example, the outcome metric may be calculated or retrieved for every data item in the first group and every data item in the control group. A median value (or other statistical metric) of the outcome metric for data items in the first group may be compared to a median value of the outcome metric for data items in the control group. If the difference exceeds some threshold either in absolute terms or relative terms, it may be deemed the first group is anomalous with respect to the control group.

At operation 612, in various examples, the method may include presenting a notification to a computing device indicating the anomaly. For example, a user may log in to a system that has performed operations 602-610. Then, the system may present, via a user interface (e.g., served via a web server), a list of all anomalous groups compared to control groups.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 7:
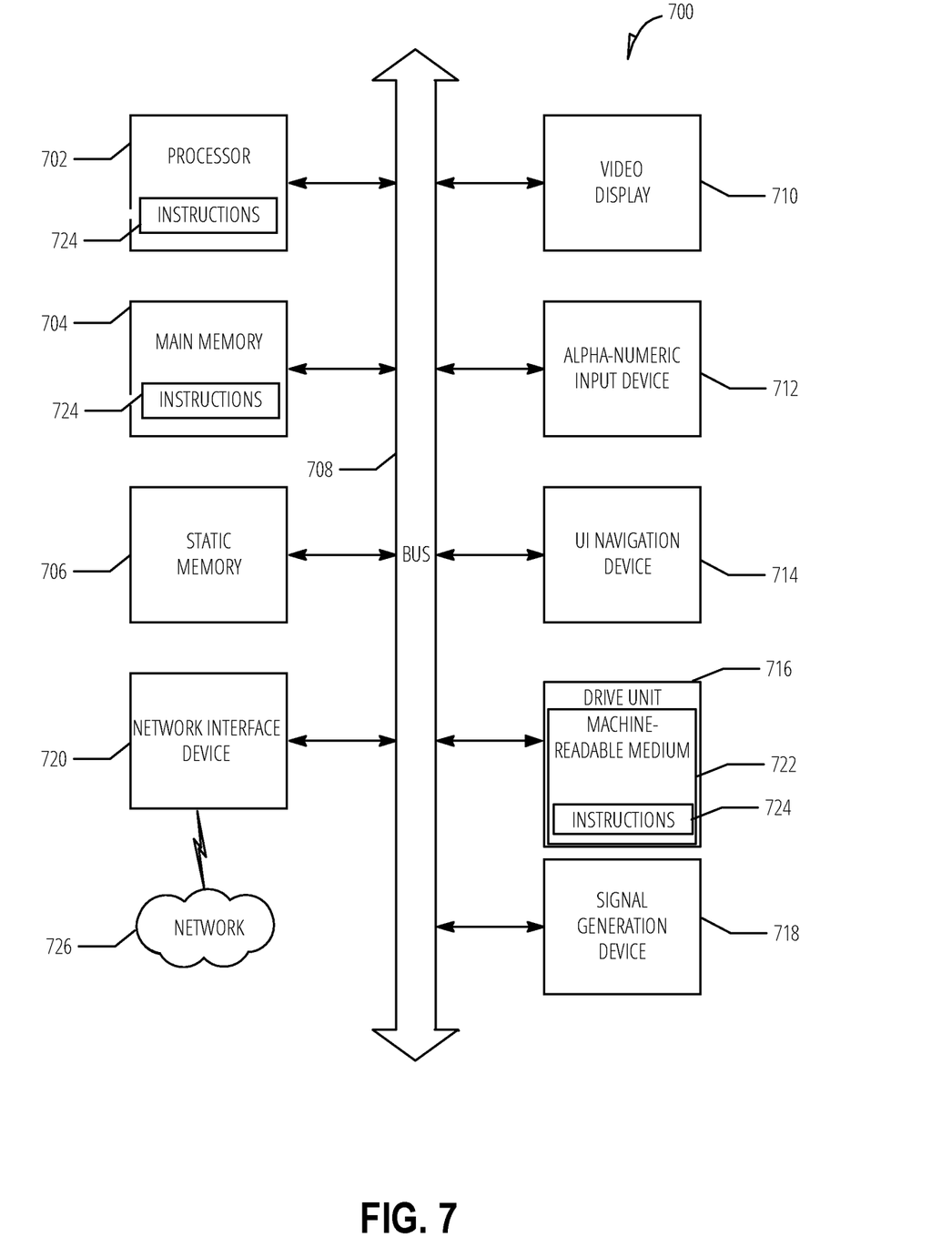
FIG. 7 is a block diagram illustrating an example machine upon which any one or more of the techniques (e.g., methodologies) discussed herein may be performed, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A, or 5G networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A system comprising:
a processing unit; and
a storage device comprising instructions, which when executed by the processing unit, configure the processing unit to:
retrieve metric data on a plurality of groups of users, the metric data including a value of a performance metric for each of the plurality of groups;
determine a control group of the plurality of groups utilizing a model based on a distance metric to calculate alikeness between users;
determine that a first group of the plurality of groups is anomalous with respect to a value of the performance metric of the control group, wherein determining that the first group is anomalous includes determining that a difference, between a median value of the performance metric for the plurality of users and a median value of the performance metric for the control group, exceeds a threshold value; and
present a user interface, the user interface including:
a first portion including a visualization of a comparison of the value of the performance metric for the first group and values of the performance metric of other groups in the plurality of groups, and an indication of the determined anomaly with reference to the determined control group; and
a second portion including a visualization of trend data of the performance metric for the first group over a period of time.

2. The system of claim 1, wherein each of the users in the plurality of users is associated with attribute values for a plurality of attributes.

3. The system of claim 2, wherein the users in the plurality of groups are selected based on sharing a value of a selected attribute of the plurality of attributes.

4. The system of claim 3, wherein users in the control group are selected based on attributes other than the selected attribute.

5. The system of claim 3, wherein the selected attribute is a reporting attribute with respect to an organization.

6. The system of claim 1, wherein the user interface further includes a selection element configured to change the performance metric, wherein determining the control group includes selecting data items of the metric data that influence the performance metric.

7. The system of claim 6, wherein the instructions, which when executed by the processing unit, configure the processing unit to:
receive selection of a new metric via the selection element;
access further metric data on the plurality of groups of users, the further metric data including:
a value for the new metric for each of the plurality of groups; and
an indication that a second group of the plurality of groups is anomalous with respect to a control group of the plurality of groups for the new metric; and
update the user interface based on the further metric data.

8. The system of claim 1, wherein the instructions, which when executed by the processing unit, configure the processing unit to:
receive a selection in the first portion of a second group of the plurality of groups; and
in response to the selection, update the second portion to include a visualization of trend data of the performance metric for the second group.

9. A storage device comprising instructions, which when executed by a processing unit, configure the processing unit to:
retrieve metric data on a plurality of groups of users, the metric data including a value of a performance metric for each of the plurality of groups;
determine a control group of the plurality of groups utilizing a model based on a distance metric to calculate alikeness between users;

determine that a first group of the plurality of groups is anomalous with respect to a value of the performance metric of the control group, wherein determining that the first group is anomalous includes determining that a difference, between a median value of the performance metric for the plurality of users and a median value of the performance metric for the control group, exceeds a threshold value; and present a user interface, the user interface including:
 a first portion including a visualization of a comparison of the value of the performance metric for the first group and values of the performance metric of other groups in the plurality of groups, and an indication of the determined anomaly with reference to the determined control group; and
 a second portion including a visualization of trend data of the performance metric for the first group over a period of time.

10. The storage device of claim 9, wherein each of the users in the plurality of users is associated with attribute values for a plurality of attributes.

11. The storage device of claim 10, wherein the users in the plurality of groups are selected based on sharing a value of a selected attribute of the plurality of attributes.

12. The storage device of claim 11, wherein users in the control group are selected based attributes other than the selected attribute.

13. The storage device of claim 11, wherein the selected attribute is a reporting attribute with respect to an organization.

14. The storage device of claim 9, wherein the user interface further includes a selection element configured to change the performance metric, wherein determining the control group includes selecting data items of the metric data that influence the performance metric.

15. The storage device of claim 9, wherein the instructions, which when executed by the processing unit, configure the processing unit to:
 receive selection of a new metric via the selection element;
 access further metric data on the plurality of groups of users, the further metric data including:
  a value for the new metric for each of the plurality of groups; and
  an indication that a second group of the plurality of groups is anomalous with respect to a control group of the plurality of groups for the new metric; and
 update the user interface based on the further metric data.

16. The storage device of claim 9, wherein the instructions, which when executed by the processing unit, configure the processing unit to:
 receive a selection in the first portion of a second group of the plurality of groups; and
 in response to the selection, update the second portion to include a visualization of trend data of the performance metric for the second group.

17. A method comprising:
 retrieving metric data on a plurality of groups of users, the metric data including a value of a performance metric for each of the plurality of groups;
 determining a control group of the plurality of groups utilizing a model based on a distance metric to calculate alikeness between users;
 determining that a first group of the plurality of groups is anomalous with respect to a value of the performance metric of the control group, wherein determining that the first group is anomalous includes determining that a difference, between a median value of the performance metric for the plurality of users and a median value of the performance metric for the control group, exceeds a threshold value; and
 presenting a user interface, the user interface including:
  a first portion including a visualization of a comparison of the value of the performance metric for the first group and values of the performance metric of other groups in the plurality of groups, and an indication of the determined anomaly with reference to the determined control group; and
  a second portion including a visualization of trend data of the performance metric for the first group over a period of time.

18. The method of claim 17, wherein each of the users in the plurality of users is associated with attribute values for a plurality of attributes.

19. The system of claim 1, wherein the instructions, which when executed by the processing unit, configure the processing unit to:
 determine a selection of a first dimension from a plurality of dimensions of the metric data; and
 form the first group to include users having a same value of the first dimension.

20. The storage device of claim 9, wherein determining that the first group is anomalous with respect to the control group of the plurality of groups is based on a difference between a median value of the performance metric for the plurality of users and a median value of the performance metric for the control group exceeding a threshold.

* * * * *